United States Patent
Takada et al.

(10) Patent No.: US 7,931,870 B2
(45) Date of Patent: Apr. 26, 2011

(54) REFORMER THAT DETERMINES A COMBUSTION STATE OF AN INCLUDED COMBUSTION SECTION AND A FUEL CELL SYSTEM INCORPORATING THE SAME

(75) Inventors: Kazumasa Takada, Nishikamo-gun (JP); Norihiko Toyonaga, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 383 days.

(21) Appl. No.: 12/104,055

(22) Filed: Apr. 16, 2008

(65) Prior Publication Data

US 2008/0268309 A1 Oct. 30, 2008

(30) Foreign Application Priority Data

Apr. 26, 2007 (JP) ................ 2007-116810

(51) Int. Cl.
*B32B 27/04* (2006.01)
(52) U.S. Cl. ........ 422/105; 422/107; 422/187; 422/188; 422/189; 422/211; 48/61; 48/127.1; 429/19; 429/20; 60/780
(58) Field of Classification Search .......... 422/187–190, 422/105–112; 48/76, 127.9, 61
See application file for complete search history.

(56) References Cited

U.S. PATENT DOCUMENTS

2006/0046114 A1    3/2006   Kato et al.

FOREIGN PATENT DOCUMENTS

| JP | 2001-165431 | 6/2001 |
|---|---|---|
| JP | 2005-90855 | 4/2005 |
| JP | 2005-257190 | 9/2005 |
| JP | 2006-2991 | 1/2006 |

OTHER PUBLICATIONS

U.S. Appl. No. 11/869,209, filed Oct. 9, 2007, Kazumasa Takada.
U.S. Appl. No. 11/861,864, filed Sep. 25, 2007, Kiyomi Yamashita.
U.S. Appl. No. 11/719,818, filed May 21, 2007, Hiroki Ohkawara.
U.S. Appl. No. 11/908,624, filed Sep. 14, 2007, Osamu Nakanishi.
U.S. Appl. No. 11/995,203, filed Jan. 10, 2008, Kazumasa Takada.
U.S. Appl. No. 12/375,142, filed Jan. 26, 2009, Ohkawara, et al.
U.S. Appl. No. 12/279,154, filed Aug. 12, 2008, Ohkawara.
U.S. Appl. No. 12/293,158, filed Sep. 16, 2008, Kuwaba.

*Primary Examiner* — Alexa D. Neckel
*Assistant Examiner* — Kaity V. Handal
(74) *Attorney, Agent, or Firm* — Oblon, Spivak, McClelland, Maier & Neustadt, L.L.P.

(57) ABSTRACT

A controller for a reformer that: changes the supply quantity of at least either one of combustible gas and combustion oxidizing gas supplied to a combustion section; detects a change which is caused in the combustion state of the combustion section as a result of a change of the supply quantity; and checks the combustion state which arose at the combustion section before the change based on the previously detected detection result. Thus, a gone-out state of the combustion section can be reliably judged with a low cost device, and the combustion state of the combustion section in the reformer of a fuel cell system can be adjusted to an optimum combustion state.

12 Claims, 5 Drawing Sheets

| Air Ratio = X | Combustion State |
|---|---|
| X < 0.98 | Certain to Go Out |
| 0.98 ≤ X < 1.05 | Strong Likelihood of Incomplete Combustion |
| 1.05 ≤ X < 1.15 | Optimum Combustion State |
| 1.15 ≤ X | Efficiency Decreases Due to Much Air Not Being Used in Combustion |

FIG. 6

| | | Output Electric Power Quantity | | |
|---|---|---|---|---|
| | | 300 W | 500 W | 1000 W |
| Air Ratio | 0.98 | 1800 RPM | 2700 RPM | 5000 RPM |
| | 1.05 | 2000 RPM | 3000 RPM | 5500 RPM |
| Rotational Speed Diff. (RPM) | | 200 RPM | 300 RPM | 500 RPM |

REFORMER THAT DETERMINES A COMBUSTION STATE OF AN INCLUDED COMBUSTION SECTION AND A FUEL CELL SYSTEM INCORPORATING THE SAME

INCORPORATION BY REFERENCE

This application is based on and claims priority under 35 U.S.C. 119 with respect to Japanese Patent Application No. 2007-116810 filed on Apr. 26, 2007, the entire content of which is incorporated herein by reference.

BACKGROUND OF THE INVENTION

1. Field of the Invention

The present invention relates to a reformer and a fuel cell system incorporating the same for generating electric power.

2. Discussion of the Related Art

As one form of reformers, there has been known a reformer which is described in Japanese unexamined, published patent application No. 2001-165431. As shown in FIG. 1 of the Japanese application, the reformer is provided with a raw fuel flow sensor 11 on a raw fuel supply passage 2 for supplying raw fuel to a reformer 1, and a feedback control is performed by a raw fuel flow controller FC1 regarding the opening degree of a raw fuel flow control valve 12. Further, an air flow sensor 13 is provided on an air supply passage 5 for supplying air to a reformer burner 4, and a feedback control is performed by an air flow controller FC2 regarding the opening degree of an air flow control valve 14. A target value for the flow of the raw fuel is restricted by a limiter 21 to come into a range of upper and lower limits which are set in dependence on an actual value of the air flow sensor 13, while a target value for the flow of air is restricted by another limiter 24 to come into another range of upper and lower limits which are set in dependence on the target value for the flow of the raw fuel. Accordingly, a large fluctuation in air-fuel ratio can be prevented in spite of the fluctuation in a load Z.

Further, another or second example has been known as one shown in Japanese unexamined, published patent application No. 2006-002991. As shown in FIG. 1 of the Japanese application, a reformer (hydrogen generator 1) is provided with a plurality of temperature detecting means 26 for detecting the temperatures of respective parts of a combustion section 18 which burns city gas, LPG, offgas (non-reacted hydrogen gas) exhausted from a fuel cell, or a gaseous body consisting of a mixture of city gas or LPG and offgas, and a control section 22 responsive to data from the temperature detecting means 26 for judging the combustion state of the combustion section 18 and for controlling blower means 21.

Further, a third example has been known as one shown in Japanese unexamined, published patent application No. 2005-257190. As shown in FIG. 1 of the Japanese application, a reformer (hydrogen generator 1) is provided with a pressure detecting means 26 for detecting the pressure on a downstream side of a combustion section 18 which burns city gas, LPG, offgas exhausted from a fuel cell or a mixture gas thereof, and a control section 22 responsive to data from the pressure detecting means 26 for judging the combustion state of the combustion section 18 and for controlling blower means 21.

Additionally, a fourth example has been known as one shown in Japanese unexamined, published patent application No. 2005-090855. As shown in FIG. 1 of the Japanese application, a reformer (hydrogen generator 1) is provided with a distributor 9 for ejecting fuel, an air blower section 10 for supplying air 11 to the fuel, pressure detecting means 22 for the fuel supplied to the distributor 9, and a control section 21 responsive to data from the pressure detecting means 22 for judging the combustion state.

However, in the reformer described in the first mentioned Japanese application, when the air-fuel ratio is shifted to the lower side due to detection errors in the raw fuel flow sensor 11 or the air flow sensor 13, it is likely to occur that the combustion section goes out, and thus, the combustion is apt to become unstable. When the air-fuel ratio is shifted to the higher side, on the contrary, the heat loss becomes larger at the combustion section because of much volume of air which does not contribute to combustion, and the efficiency is apt to go down. Further, the use of the flow sensors which are generally more expensive than temperature sensors may cause the device to rise in cost.

The reformers described in the second through fourth Japanese applications are configured respectively to perform the combustion state judgment of the combustion section 18 and the control of the blower means 21 in receipt of the data from the plurality of temperature detecting means 26 for detecting the temperatures of respective parts of the combustion section 18; to perform the combustion state judgment of the combustion section 18 and the control of the blower means 21 in receipt of the data from the pressure detecting means 26 for detecting the pressure on the downstream side of the combustion section 18; and to perform the judgment of the combustion state in receipt of the data from the pressure detecting means 22 for the fuel supplied to the distributor 9. However, because the combustion state in each of the reformers is judged in dependence on the data from the various detecting means, there is a risk that the combustion may be erroneously judged due to detection errors in the detecting means.

SUMMARY OF THE INVENTION

Accordingly, it is a primary object of the present invention to provide an improved reformer capable of reliably judging that a combustion section is likely to go out, at a low cost and also capable of adjusting the combustion section to an optimum combustion state.

Another object of the present invention is to provide an improved fuel system incorporating the reformer of the character set forth above, so that the efficiency in electric power generation can be enhanced.

Briefly, according to the present invention, there is provided a reformer which comprises a reforming section for generating hydrogen-containing fuel gas by reforming reformed fuel, a combustion section for burning combustible gas with combustion oxidizing gas to heat the reforming section with the resultant combustion gas, combustible gas supply means for supplying the combustible gas to the combustion section, combustion oxidizing gas supply means for supplying the combustion oxidizing gas to the combustion section, combustion state detecting means for detecting the combustion state of the combustion section, and supply quantity changing means for changing the supply quantity of at least either one of the combustible gas and the combustion oxidizing gas supplied to the combustion section. The reformer further comprises combustion state change detecting means responsive to a detection result from the combustion state detecting means for detecting a change which is caused in the combustion state of the combustion section as a result that the change of the supply quantity is brought by the supply quantity changing means, and combustion state checking means responsive to the detection result from the combustion state change detecting means for checking the combustion state which arose at the combustion section before the change made by the supply quantity changing means.

With this construction, the supply quantity changing means changes the supply quantity of at least either one of combustible gas and combustion oxidizing gas supplied to the combustion section, the combustion state change detecting means detects a change which is caused in the combustion state of the combustion section as a result that the supply quantity is changed by the supply quantity changing means, based on the detection result from the combustion state detecting means, and the combustion state checking means checks the combustion state of the combustion section which arose before the change by the supply quantity changing means, based on the detection result from the combustion state change detecting means. Thus, it becomes possible to change the supply quantity of at least either one of combustible gas and combustion oxidizing gas supplied to the combustion section. In addition, since the change in the combustion state of the combustion section resulting from the change in the supply quantity can be detected based on the detection result from the combustion state detecting means, it also becomes possible to check the combustion state of the combustion section which arose before the change by the supply quantity changing means, based on the detection result. That is, insofar as the supply means for combustible gas and combustion oxidizing gas and the combustion state detecting means operate correctly, it can be realized to check the combustion state of the combustion section which arose before the change by the supply quantity changing means. Accordingly, without using expensive sensors, it becomes possible to detect the state of the combustion section being likely to go out, reliably at a low cost.

In another aspect of the present invention, there is provided a fuel cell system, which comprises the reformer of the character set forth above and a fuel cell having a fuel pole to which the reformed gas generated in the reformer is supplied as fuel gas. At least either one of combustion fuel supplied from the outside of the system, the reformed gas led from the reformer and fuel gas offgas led from the fuel pole of the fuel cell is supplied as combustible gas to the combustion section of the reformer.

Since the fuel cell system with this construction is provided with the reformer which is capable of reliably detecting at a low cost the state of the combustion section being likely to go out, it is possible to make the entire system low in cost and nevertheless, to reliably detect the state of the combustion section being likely to go out. As a consequence, the efficiency of the fuel cell system in electric power generation can be enhanced with the reformer operating in an optimum combustion state.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
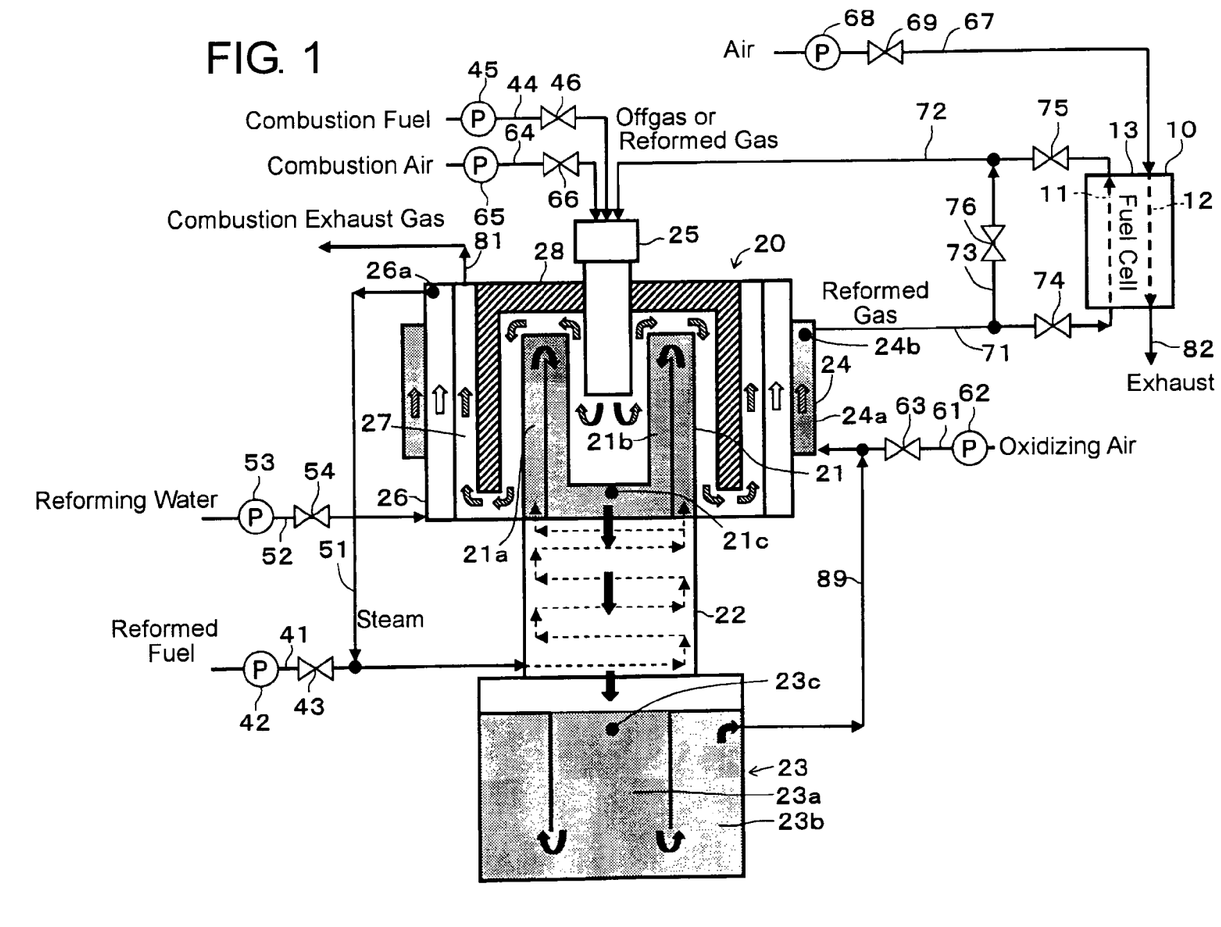
FIG. 1 is a schematic view showing the outline of a fuel cell system incorporating a reformer in one embodiment according to the present invention.

Hereafter, a fuel cell system incorporating a reformer in one embodiment according to the present invention will be described with reference to the drawings. FIG. 1 is a schematic view showing the outline of the fuel cell system. The fuel cell system is provided with a fuel cell 10 and a reformer 20 for generating reformed gas (fuel gas) containing hydrogen gas needed for the fuel cell 10.

The fuel cell 10 is provided with a fuel pole 11, an air pole 12 as an oxidizing agent or oxidizer pole, and an electrolyte 13 interposed between both of the poles 11 and 12. The fuel cell 10 is operable to generate electric power by using reformed gas supplied to the fuel pole 11 and air (cathode gas) as oxidizing gas supplied to the air pole 12. Instead of air, there may be supplied gas which is air enriched with oxygen.

The reformer 20 reforms reformed fuel (i.e., raw fuel to be reformed) with steam and supplies the fuel cell 10 with hydrogen-rich reformed gas. The reformer 20 is composed of a reforming section 21, a cooler section 22, a carbon monoxide shift reaction section (hereafter referred to as "CO shift section") 23 and a carbon monoxide selective oxidation reaction section (hereafter referred to as "CO selective oxidation section") 24, a burner or combustion section 25 and an evaporator section 26. As the raw fuel to be reformed, there may be employed gaseous fuel such as natural gas, LPG or the like, or liquid fuel such as kerosene, gasoline, methanol or the like. The present embodiment will hereafter be described in a form using natural gas as the raw fuel to be reformed. Accordingly, the term "reformed fuel," used throughout, refers to the fuel to be reformed by the reformer 20.

The reforming section 21 generates and derives reformed gas from a mixture gas as reformed material in which the reformed fuel is mixed with reforming water. The reforming section 21 takes a bottomed cylindrical form and is provided in an annular cylinder with an annular turnover flow passage 21a extending along the axis of the annular cylinder. The reforming section 21 is made of stainless steel.

The turnover flow passage 21a of the reforming section 21 is filled with catalyzer 21b (e.g., ruthenium (Ru) or nickel (Ni) base catalyzer), and mixture gas which is a mixture of the reformed fuel (i.e., raw fuel) introduced from the cooler section 22 and steam introduced from a steam supply pipe 51 reacts through the catalyzer 21b and is reformed to generate hydrogen gas and carbon monoxide gas (a so-called steam reforming reaction). At the same time, a so-called carbon monoxide shift reaction takes place, in which the carbon monoxide which is generated through the steam reforming reaction reacts with steam to turn into hydrogen gas and carbon dioxide. These regenerated gases (so-called "reformed gas" collectively) are led to the cooler section (heat exchange section) 22. The steam reforming reaction is an endothermic reaction, whereas the carbon monoxide shift reaction is an exothermic reaction.

Further, the reforming section 21 is provided therein with a temperature sensor 21c for measuring the temperature in the reforming section 21 such as, e.g., the temperature in the neighborhood of a wall which is adjacent to the combustion section 25. The detection result is transmitted to a system controller 30, referred to later with reference to FIG. 2. Since the temperature detected by the temperature sensor 21c (i.e., the temperature of the neighborhood of the wall close to the combustion section 25) reflects the combustion state of the combustion section 25, the temperature sensor 21c serves as combustion state detecting means for detecting the combustion state of the combustion section 25. As other combustion state detecting means, there may be employed a flame rod type for measuring ion current in the flame at the combustion section 25, a method of detecting the pressure at the combustion section, or the like.

The cooler section 22 is constituted by a heat exchanger (heat exchange section) for performing heat exchange between the reformed gas led from the reforming section 21 and the mixture of reformed fuel (i.e., pre-reformed fuel) and reforming water (steam). The cooler section 22 lowers the temperature of the high-temperature reformed gas with the low-temperature mixture gas to lead the reformed gas to the CO shift section 23 while raising the temperature of the mixture gas with the reformed gas to lead the mixture gas to the reforming section 21.

Specifically, the cooler section 22 has connected thereto a reformed fuel supply pipe 41 which is connected to a fuel supply source (not shown) such as, e.g., a city gas pipe. The reformed fuel supply pipe 41 is provided thereon with a reformed fuel pump 42 and a reformed fuel valve 43 in order from the upstream side. The reformed fuel valve 43 operates to open or close the fuel supply pipe 41. The reformed fuel pump 42 serves as reformed fuel supply means for supplying reformed fuel (i.e., raw fuel) and for regulating the supply quantity. Further, a steam supply pipe 51 connected to the evaporator section 26 is connected to the fuel supply pipe 41 between the reformed fuel valve 43 and the cooler section 22. The steam supplied from the evaporator section 26 is mixed with reformed fuel, and the resultant mixture gas is supplied to the reforming section 21 by way of the cooler section 22.

The CO shift section 23 is a carbon monoxide reduction section for reducing the carbon monoxide in the reformed gas which is supplied from the reforming section 21 by way of the cooler section 22. The CO shift section 23 is provided therein with a turnover flow passage 23a extending in a vertical direction. The turnover flow passage 23a is filled with catalyzer 23b (e.g., copper (Cu)-zinc (Zn) base catalyzer). In the CO shift section 23, a so-called carbon monoxide shift reaction takes place, in which the carbon monoxide and the steam contained in the reformed gas led from the cooler section 22 react through the catalyzer 23b to turn into hydrogen gas and carbon dioxide gas. This carbon monoxide shift reaction is an exothermic reaction.

Further, the CO shift section 23 is provided therein with a temperature sensor 23c for measuring the temperature in the CO shift section 23. The detection result of the temperature sensor 23c is transmitted to the system controller 30.

The CO selective oxidation section 24 is also another carbon monoxide reduction section for further reducing the carbon monoxide in the reformed gas supplied from the CO shift section 23 to supply the reformed gas to the fuel cell 10. The CO selective oxidation section 24 takes an annular cylindrical form and is provided in contact with the outer circumferential wall of the evaporator section 26 to cover the outer circumferential wall. The CO selective oxidation section 24 is filled with catalyzer 24a (e.g., ruthenium (Ru) or platinum (Pt) base catalyzer).

Further, the CO selective oxidation section 24 is provided therein with a temperature sensor 24b for measuring the temperature in the CO selective oxidation section 24. The detection result of the temperature sensor 24b is transmitted to the system controller 30.

The CO selective oxidation section 24 is connected at lower and upper portions of its lateral wall surface respectively to a connection pipe 89 connected to the CO shift section 23 and a reformed gas supply pipe 71 connected to the fuel pole 11 of the fuel cell 10. The connection pipe 89 has an oxidizing air supply pipe 61 connected thereto. Thus, the CO selective oxidation section 24 can be supplied with the reformed gas from the CO shift section 23 and oxidizing air from the atmosphere. The oxidizing air supply pipe 61 is provided thereon with an oxidizing air pump 62 and an oxidizing air valve 63 in order from the upstream side. The oxidizing air pump 62 is for supplying oxidizing air and for regulating the supply quantity. The oxidizing air valve 63 operates to open or close the oxidizing air supply pipe 61.

Accordingly, the carbon monoxide in the reformed gas led to the CO selective oxidation section 24 reacts to (is oxidized with) oxygen in the oxidizing air to turn into carbon dioxide. This reaction is an exothermic reaction and is expedited by the catalyzer 24a. Thus, the reformed gas is further reduced (less than 10 ppm) in the density of carbon monoxide through oxidation reaction and is supplied to the fuel pole 11 of the fuel cell 10.

The combustion section 25 is supplied with at least either one of combustible fuel and respective combustible gases from the reforming section 21 and the fuel pole 11 of the fuel cell 10 and is also supplied with combustion air being combustion oxidizing gas. The combustion section 25 burns either one of the combustible gases with the combustion oxidizing gas and heats the reforming section 21 with the resultant burning or combustion gas. The combustion section 25 generates combustion gas to heat the reforming section 21 and to supply the same with heat necessary for the steam reforming reaction. The combustion section 25 is arranged inside the reforming section 21, with its lower end portion being inserted into a cylindrical space inside an inner circumferential wall of the reforming section 21 and being spaced from the inner circumferential wall. The combustion fuel is raw fuel which is of the same kind as the reformed fuel and which is supplied from a fuel supply source, as referred to later. The combustion fuel is supplied as it is (i.e., without being reformed) directly to the combustion section 25 for burning thereat.

The combustion section 25 is connected thereto a combustion fuel supply pipe 44 which is connected to a fuel supply source (not shown) such as, e.g., a city gas pipe, and is also connected to the other end of an offgas supply pipe 72 which is connected at one end to an outlet port of the fuel pole 11. Basically, at the beginning of a starting operation of the fuel cell system, combustion fuel is supplied to the combustion section 25, and during the starting operation of the fuel cell system, the reformed gas from the CO selective oxidation section 24 is supplied to the combustion section 25 without passing through the fuel cell 10. Further, during an ordinary operation of the fuel cell system, the anode offgas (i.e., hydrogen-containing reformed gas being not consumed at the fuel pole 11) being the fuel gas offgas exhausted from the fuel cell 10 is supplied to the combustion section 25. The deficiency or shortfall of the reformed gas or the offgas is replenished with the combustion fuel.

Further, a combustion air supply pipe 64 is further connected to the combustion section 25, and combustion air is supplied from the atmosphere for burning (oxidizing) combustible gas such as combustion fuel, reformed gas or anode offgas.

The combustion fuel supply pipe 44 is provided thereon with a combustion fuel pump 45 and a combustion fuel valve 46 in order from the upstream side. The combustion fuel pump 45 constitutes combustion fuel supply means for supplying combustion fuel and for regulating the supply quantity. The combustion fuel valve 46 operates to open or close the combustion fuel supply pipe 44. Further, the combustion air supply pipe 64 is provided thereon with a combustion air pump 65 and a combustion air valve 66 in order from the upstream side. The combustion air pump 65 constitutes combustion oxidizing gas supply means for supplying combustion air being combustion oxidizing gas and for regulating the supply quantity. The combustion air valve 66 operates to open or close the combustion air supply pipe 64.

When the combustion section 25 constructed as above is ignited, combustion fuel supplied from the outside of the system, reformed gas or anode offgas is burned with combustion air to generate high-temperature combustion gas. The combustion gas flows through a combustion gas flow passage 27 and is exhausted as combustion exhaust gas through an exhaust pipe 81. Thus, the combustion gas heats the reforming section 21 and the evaporator section 26 in this order. The combustion gas flow passage 27 is a flow passage which is arranged to go along the inner circumferential wall of the reforming section 21 in contact with the wall, then along between the outer circumferential wall of the reforming section 21 and a heat insulator section 28 in contact therewith after being turned down, and finally along between the heat insulator section 28 and the evaporator section 26 in contact therewith after being turned up.

The aforementioned combustion fuel supply means (i.e., the combustion fuel pump 45) serves as combustible gas supply means for supplying the combustion section 25 with combustion fuel being combustible gas. The aforementioned combustion oxidizing gas supply means (i.e., the combustion air pump 65) is for supplying the combustion section 25 with combustion air being combustion oxidizing gas. The reformed fuel supply means (i.e., the reformed fuel pump 42) also serves as combustible gas supply means for supplying the reforming section 21 with reformed fuel (i.e., raw fuel) and then supplying the combustion section 25 with anode offgas and reformed gas which are combustible gases.

The evaporator section 26 is for generating steam by heating and boiling reforming water and for supplying the steam to the reforming section 21 by way of the cooler section 22. The evaporator section 26 is formed to take a cylindrical shape and is provided to cover the outer circumferential wall for the combustion gas flow passage 27 in contact with the wall.

The evaporator section 26 is connected at its lower portion (e.g., a lower part of the lateral wall surface or a bottom surface) to a feedwater pipe 52 which is connected to a reforming water tank (not shown). The evaporator section 26 is connected at its upper portion (e.g., an upper portion on the lateral wall surface) to the aforementioned steam supply pipe 51. The reforming water led from the reforming water tank is heated with the heat of the combustion gas and the heat from the CO selective oxidation section 24 in the course of flowing toward the evaporator section 26 and turns into steam to be led to the reforming section 21 through the steam supply pipe 51 and the cooler section 22. The feedwater pipe 52 is provided thereon with a reforming water pump 53 and a reforming water valve 54 in order from the upstream side. The reforming water pump 53 is for supplying reforming water to the evaporator section 26 and for regulating the supply quantity of the reforming water. The reforming water valve 54 operates to open or close the feedwater pipe 52.

Further, the evaporator section 26 is provided with a temperature sensor 26a for detecting the temperature of the steam in the evaporator section 26. The detection result of the temperature sensor 26a is transmitted to the system controller 30. As far as the detection of the steam temperature can be done, the temperature sensor 26a may be provided at, e.g., around an inlet port of the cooler section 22 or on the steam supply pipe 51 between the evaporator section 26 and the cooler section 22. The temperature of the steam is regarded as the temperature of the reforming water supplied to the reforming section 21.

The fuel pole 11 of the fuel cell 10 is connected at its inlet port to the CO selective oxidation section 24 through the reformed gas supply pipe 71 and at its outlet port to the combustion section 25 through the offgas supply pipe 72. A bypath pipe 73 bypaths the fuel cell 10 to make direct connection between the reformed gas supply pipe 71 and the offgas supply pipe 72. The reformed gas supply pipe 71 is provided thereon with a first reformed gas valve 74 between its branched point to the bypath pipe 73 and the fuel cell 10. The offgas supply pipe 72 is provided thereon with an offgas valve 75 between its merging point with the bypath pipe 73 and the fuel cell 10. The bypath pipe 73 is provided with a second reformed gas valve 76.

During a starting operation, the first reformed gas valve 74 and the offgas valve 75 are closed and the second reformed gas valve 76 is opened, so that the reformed gas being high in the density of carbon monoxide is avoided to be supplied from the reformer 20 to the fuel cell 10. During an ordinary operation (during a power generating operation), the first reformed gas valve 74 and the offgas valve 75 are opened and the second reformed gas valve 76 is closed, so that the reformed gas is supplied from the reformer 20 to the fuel cell 10.

The air pole 12 of the fuel cell 10 is connected to a cathode air supply pipe 67 at its inlet port and to an exhaust pipe 82 at its outlet port. The air pole 12 is supplied with air, and offgas is exhausted from the exhaust pipe 82. The cathode air supply pipe 67 is provided with a cathode air pump 68 and a cathode air valve 69 in order from the upstream side. The cathode air pump 68 is for supplying cathode air and for regulating the supply quantity. The cathode air valve 69 operates to open or close the cathode air supply pipe 67.

Figure 2:
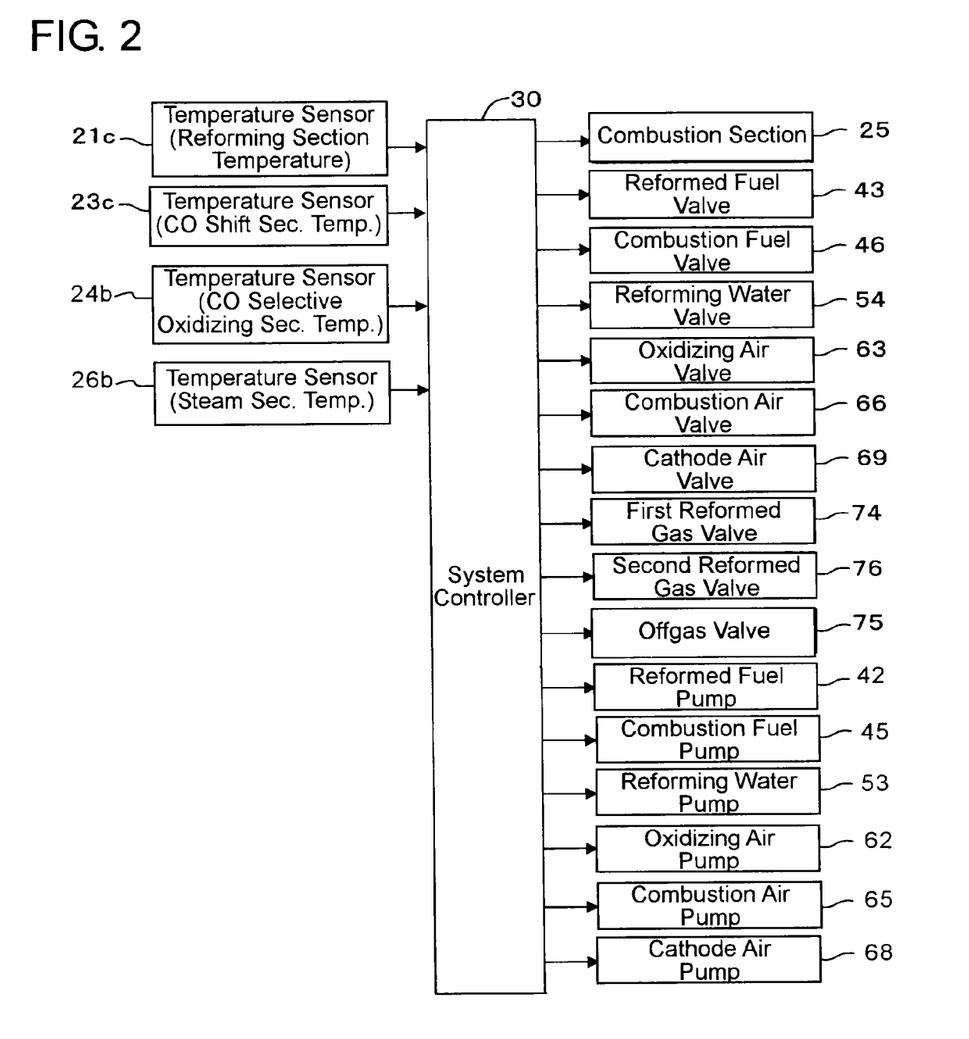
FIG. 2 is a block diagram showing a system control configuration of the fuel cell system shown in FIG. 1.

Further, as shown in FIG. 2, the fuel cell system is provided with the system controller 30, which has connected thereto the temperature sensors 21c, 23c, 24b, 26a, the respective pumps 42, 45, 53, 62, 65, 68, the respective valves 43, 46, 54, 63, 66, 69, 74, 75, 76 and the combustion section 25 all aforementioned. The system controller 30 incorporates therein a microcomputer (not show), which has an input/output interface, a CPU, a RAM and a ROM (all not shown) connected thereto through bus lines. The CPU executes the operation of the reformer 20 by controlling the respective pumps 42, 45, 53, 62, 65, 68, the respective valves 43, 46, 54, 63, 66, 69, 74, 75, 76 and the combustion section 25 based on the temperatures from the temperature sensors 21c, 23c, 24b, 26a. The RAM temporally stores variables which are necessary to execute programs for the control operation, and the ROM stores the programs.

(Operation)

The operation of the fuel cell system as constructed above will be described hereafter. When a start switch (not shown) is turned on at time t0, the system controller 30 starts a starting operation of the fuel cell system. More specifically, the fuel cell system operates in a warm-up operation mode. The system controller 30 opens the combustion air valve 66 and drives the combustion air pump 65 to supply combustion air to the combustion section 25. Further, the system controller 30 electrifies an ignition electrode of the combustion section 25. Further, the system controller 30 opens the combustion fuel valve 46 and drives the combustion fuel pump 45 to supply combustion fuel to the combustion section 25. Thus, the combustion fuel is burned at the combustion section 25, and the reforming section 21 and the evaporator section 26 are heated with the combustion gas. During this time, the reformed fuel valve 43, the reforming water valve 54, the oxidizing air valve 63, the first reformed gas valve 74, the second reformed gas valve 76 and the offgas valve 75 remain all closed.

Upon starting, the system controller 30 supplies water of a predetermined quantity to the evaporator section 26 (if the system is under a negative pressure, the system controller 30 supplies the water after the system is placed under a positive pressure) and then, once discontinues the supply of water. Thereafter, when the temperature sensor 26a indicates a predetermined value (e.g., 100° C.) or higher, the system controller 30 judges that steam has been generated. Then, after confirming the generation of steam, the system controller 30 resumes supplying water to the evaporator section 26 at a predetermined flow rate.

Subsequently, the system controller 30 opens the reformed fuel valve 43 and drives the reformed fuel pump 42 to supply reformed fuel (i.e., raw fuel) to the reforming section 21. Further, the system controller 30 opens the oxidizing air valve 63 and drives the oxidizing air pump 62 to supply oxidizing air at a predetermined flow rate (predetermined quantity) only to the CO selective oxidation section 24. Thus, the reforming section 21 is supplied with mixture gas of reformed fuel and steam, and the aforementioned steam reforming reaction and the carbon monoxide shift reaction take place at the reforming section 21 to generate reformed gas. The reformed gas led from the reforming section 21 is reduced in carbon monoxide gas at the CO shift section 23 and the CO selective oxidation section 24 and is outputted from the CO selective oxidation section 24. The reformed gas reduced in carbon monoxide gas is supplied directly to the combustion section 25 through the bypath pipe 73 without passing through the fuel cell 10. At this time, the combustion fuel pump 45 remains stopped. If the reforming section runs short of the heat quantity required for reforming, however, the combustion fuel valve 46 is opened and the combustion fuel pump 45 is driven to supply combustion fuel to the combustion section 25, so that the shortfall in heat quantity can be replenished.

During such generation of reformed gas, the system controller 30 detects the temperature of the catalyzer 24a in the CO selective oxidation section 24 (and/or the temperature of the catalyzer 23b in the CO shift section 23) by the temperature sensor 24b (and/or the temperature sensor 23c). If the detected temperature is a predetermined temperature or higher, the system controller 30 judges that the density of carbon monoxide in the reformed gas has come down lower than a predetermined low density. In this judgment, the system controller 30 opens the first reformed gas valve 74 and the offgas valve 75 and closes the second reformed gas valve 76 to connect the CO selective oxidation section 24 to the inlet port of the fuel pole 11 of the fuel cell 10 and to connect the outlet port of the fuel pole 11 to the combustion section 25. This terminates the starting operation for warming up the fuel cell system and then initiates the ordinary operation. That is, the fuel cell system turns into a power generation mode.

In the power generation mode, the system controller 30 operates to supply reformed fuel, combustion fuel, combustion air, oxidizing air, cathode air and reforming water so that there can be generated a desired output electric power (electric current and power meeting those consumed by load devices). Specifically, the system controller 30 calculates the supply quantity of reformed fuel to output the desired electric power and drives the reformed fuel pump 42 to attain the calculated supply quantity, calculates the supply quantity of the reforming water on the basis of the calculated supply quantity of reformed fuel and a steam-to-carbon (S/C) ratio, and drives the reforming water pump 53 to attain the calculated supply quantity of reforming water. Further, the system controller 30 calculates the supply quantity of combustion air on the basis of the supply quantity of reformed fuel and the like and drives the combustion air pump 65 to attain the calculated supply quantity. Further, the system controller 30 calculates the supply quantity of oxidizing air to make the carbon monoxide in the combustion gas less than a predetermined quantity and drives the oxidizing air pump 62 to attain the supply quantity. Then, the system controller 30 calculates the supply quantity of cathode air sufficient to react with the reformed gas supplied from the reformer 20 and drives the cathode air pump 68 to attain the supply quantity. When a stop switch (not shown) is depressed thereafter, the fuel cell system performs a stop preparatory operation before being stopped. Even in the power generation mode, if the reforming section 21 runs short of the heat quantity required for reforming, the combustion fuel valve 46 is opened and the combustion fuel pump 45 is driven to supply combustion fuel to the combustion section 25, so that the shortfall of the heat quantity can be replenished.

Next, the operation for checking the combustion state of the aforementioned fuel cell system will be described with reference to FIG. 3. The system controller 30 initiates to execute a checking program for the combustion state at predetermined time intervals, that is, at the frequency of, e.g., every several hours or every several days after the operation starting. (step 100). The system controller 30 reduces the rotational speed of the combustion air pump 65 by a fixed value from that rotational speed which was set at the time of the program starting (step 102). Thus, the supply quantity of combustion air supplied to the combustion section 25 is decreased by a predetermined quantity.

The fixed value (rotational speed) has been determined to be set in dependence on the quantity of the electric power being outputted from the fuel cell 10. For example, as shown in TABLE 1 below, the fixed value is 500 rpm (corresponding to 2.5 liter per minute in flow rate) at the time of 1,000 watt output electric power, 300 rpm (corresponding to 1.5 liter per minute in flow rate) at the time of 500 watt output electric power and 200 rpm (corresponding to 1.0 liter per minute in flow rate) at the time of 300 watt output electric power.

TABLE 1

| Output Electric Power Quantity (watts) | 1,000 | 500 | 300 |
|---|---|---|---|
| Fixed Value (rpm) | 500 | 300 | 200 |
| Air Flow Rate (litter per minute) | 2.5 | 1.5 | 1.0 |

These fixed values are calculated as follows. The air ratio and the combustion state of the combustion section 25 have a close relation indicated in FIG. 5 for example. That is, when the air ratio is less than 0.98, the combustion section 25 is certain in a gone-out state (i.e., the combustion section 25 has gone out). When the air ratio is in a range of 0.98 to 1.05, the combustion section 25 is in a burning state but likely in an incomplete combustion state (gray zone). When the air ratio is in a range of 1.05 to 1.15, the combustion section 25 is in a burning state and in an optimum burning state. When the air ratio is greater than 1.15, the combustion section 25 is in a burning state, but is lowered in efficiency due to much air not working for combustion.

The air ratio is "actual supply quantity of combustion air/ideal supply quantity of combustion air", that is, "actual air-fuel ratio/theoretical air-fuel ratio". The air-fuel ratio is the ratio obtained by dividing the mass of supplied air by the mass of supplied combustible gas. The theoretical air ratio is the air-fuel ratio at which oxygen in the atmosphere and combustible gas react neither too much nor too little. The ideal supply quantity of combustion air is the supply quantity of combustion air which enables oxygen in the atmosphere and combustible gas to react neither too much nor too little.

Figure 6:
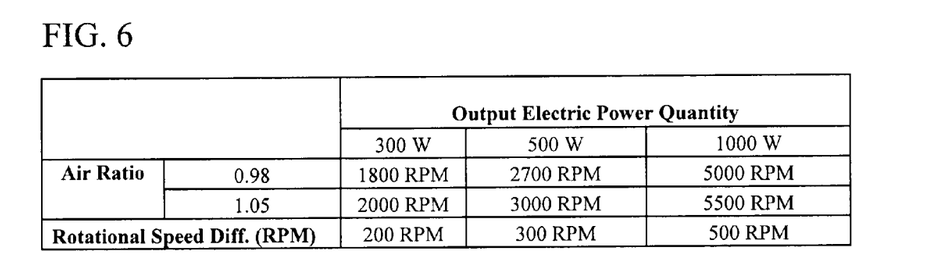
FIG. 6 is another table showing relation between air ratios and rotational speeds of a combustion air pump for respective output electric power quantities.

Further, in the fuel cell system in the present embodiment, a relation indicted in FIG. 6 for example resides between the aforementioned air ratios for the respective output electric power quantities of the fuel cell 10 (a boundary value between the gone-out state and the gray zone and another boundary value between the gray zone and the optimal combustion state) and the rotational speeds of the combustion air pump 65. That is, in the case of the output electric power quantity being 300 watts, the rotational speed of the combustion air pump 65 for the air ratio of 0.98 is 1,800 rpm and the rotational speed of the combustion air pump 65 for the air ratio of 1.05 is 2,000 rpm. The difference in the air ratio from the optimum combustion state to the complete gone-out state corresponds to 200 rpm in the rotational speed of the combustion air pump 65. This is because in the fuel cell system, the more quantity the output electric power becomes, the more quantity the supplied quantity of the reformed fuel requires and because the more quantity the heat quantity for reforming requires, the more quantity the combustion air to keep the air ratio constant requires.

Likewise, in the case of the output electric power quantity being 500 watts, the rotational speed of the combustion air pump 65 for the air ratio of 0.98 is 2,700 rpm, and the rotational speed of the combustion air pump 65 for the air ratio of 1.05 is 3,000 rpm. The difference in the air ratio from the optimum combustion state to the complete gone-out state corresponds to 300 rpm in the rotational speed of the combustion air pump 65. Further, in the case of the output electric power quantity being 1,000 watts, the rotational speed of the combustion air pump 65 for the air ratio of 0.98 is 5,000 rpm, and the rotational speed of the combustion air pump 65 for the air ratio of 1.05 is 5,500 rpm. The difference in the air ratio from the optimum combustion state to the complete gone-out state corresponds to 500 rpm in the rotational speed of the combustion air pump 65. As described above, the aforementioned fixed value is set to the rotational speed difference which corresponds to the difference from the optimum combustion state to the complete gone-out state for each of the respective output electric power quantities.

After changing the supply quantity of combustion air, the system controller 30 waits until the combustion state of the combustion section 25 becomes stable (step 104) and then, makes reference to the temperature of the combustion section 25 measured by the temperature sensor 21c to judge whether or not the combustion state (the state after the supply quantity change) is in the gone-out state (step 106). That is, the system controller 30 judges the occurrence of the gone-out state from the temperature drop at the combustion section 25. Where no substantial change in the temperature of the combustion section 25 occurs before and after the supply quantity change, the system controller 30 judges that the combustion state is not the gone-out state (i.e., it is the burning state), to make judgment of "NO" at step 106 and advances the program to step 108. Further, where the temperature of the combustion section 25 goes down by a predetermined value or more before and after the change in the supply quantity of the combustion air, the system controller 30 judges that the combustion state is in the gone-out state, and make judgment of "YES" at step 106 to advance the program to step 114.

When judging that the combustion state is not the gone-out state, the system controller 30 sets it as the checking result of the combustion state that the combustion section 25 is unlikely to go out (step 108) and then, returns the rotational speed of the combustion air pump 65 to that before the change (step 110). The system controller 30 terminates the present program (step 112) and further continues the operation of the fuel cell system.

When judging that the combustion state is the state of being likely to go out, on the contrary, the system controller 30 sets it as the checking result of the combustion state that the combustion section 25 is likely to go out (step 114) and stops the operation of the fuel cell system (step 116). In addition thereto, the system controller 30 sets the rotational speed of the combustion air pump 65 to a value which is further increased by the fixed value from the rotational speed before the change, for the operation at the next time (step 118) and then terminates the present program (step 112).

Figure 5:
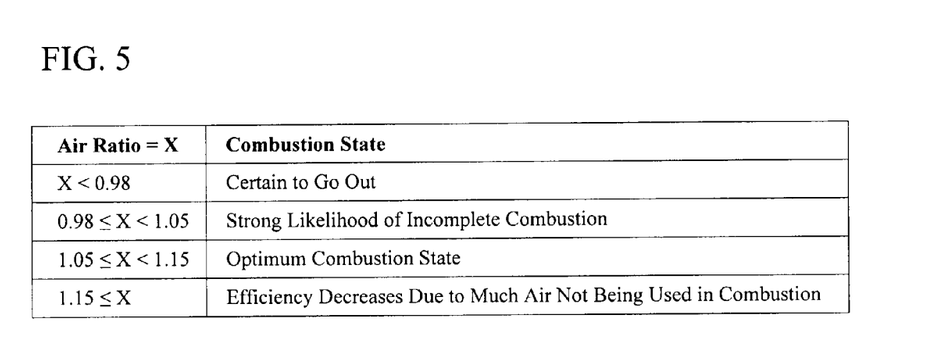
FIG. 5 is a table showing the relation between air ratios and combustion states.

For example, let it be now assumed that the output electric power quantity of the fuel cell 10 is 1,000 watts. If the combustion state of the combustion section 25 before change in the supply quantity of the combustion air at step 102 is in a zone in which the likelihood of the incomplete burning is high, the air ratio is in a range of 0.98 to 1.05 as shown in FIG. 5. In this state, by reducing the rotational speed of the combustion air pump 65 by 500 rpm (i.e., the fixed value) set for the output electric power quantity (step 102), the air ratio becomes lower than 0.98, and this brings the combustion section 25 into the gone-out state. In other words, the fact that reducing the rotational speed by the fixed value causes the combustion section 25 to go out means that the combustion state of the combustion section 25 before the rotational speed change (right before the change) is not an optimum combustion state and is in a zone wherein the likelihood of the incomplete combustion state is high, that is, is in the state of being likely to go out.

If the combustion state of the combustion section 25 before the change in the supply quantity of the combustion air is in a zone for the optimum combustion state, on the contrary, the air ratio is higher than 1.05 as shown in FIG. 5. In this state, even when the rotational speed of the combustion air pump 65 is reduced by 500 rpm (i.e., the fixed value) set for the output electric power quantity, the combustion section 25 is not brought into the gone-out state because the air ratio is higher than 0.98, and the combustion section 25 is kept in the burning state. In other words, the fact that reducing the rotational speed by the fixed vale does not cause the combustion section 25 to go out means that the combustion state of the combustion section 25 before the rotational speed change (right before the change) is not in the zone wherein the likelihood of the incomplete combustion state is high, and is the optimum burning state or a state which is higher in the air ratio than the optimum burning state, that is, is the state of being unlikely to go out.

Next, the operation for adjusting the air ratio in the aforementioned fuel cell system will be described with reference to FIG. 4. The system controller 30 initiates the execution of an air ratio adjusting program at predetermined time intervals, that is, at the frequency of, e.g., every several days or every several months after the operation starting for the first time. (step 200). The system controller 30 reduces the rotational speed of the fuel air pump 65 by the fixed value from that rotational speed which was set at the time of the program starting (step 102). Thus, the supply quantity of combustion air supplied to the combustion section 25 is decreased by the predetermined quantity. The fixed value is the same as that used in the aforementioned checking program for the combustion state.

After changing the supply quantity of combustion air, the system controller 30 waits until the combustion state of the combustion section 25 becomes stable (step 104) and then, makes reference to the temperature of the combustion section 25 measured by the temperature sensor 21*c* to judge whether or not the combustion state (the state after the supply quantity change) is the gone-out state (step 106). That is, if the temperature of the combustion section 25 hardly changes before and after the change in the supply quantity of the combustion air, the system controller 30 judges that the combustion state is not the gone-out state (i.e., is the burning state). Thus, the system controller 30 makes judgment of "NO" at step 106 and advances the program to step 108. If the temperature of the combustion section 25 goes down through the predetermined temperature or more before and after the change in the supply quantity of the combustion air, the system controller 30 judges that the combustion state is the gone-out state and makes judgment of "YES" at step 106 to advance the program to step 114.

When judging that the combustion state is not the gone-out state (i.e., the combustion section 25 has not gone out), the system controller 30 sets the state of being unlikely to go out as the result of checking the combustion state (step 108) and returns the program to step 102. The system controller 30 further reduces the rotational speed of the combustion air pump 65 by the fixed value (step 102). After waiting until the combustion state of the combustion section 25 becomes stable (step 104), the system controller 30 makes reference to the temperature of the combustion section 25 measured by the temperature sensor 21*c* to judge whether or not the combustion state (i.e., the state after the last supply quantity change) is the gone-out state (step 106). In this way, the system controller 30 repetitively executes the processing from step 102 to step 108 until the combustion state is judged to be the gone-out state at step 106.

When judging that the combustion state is the gone-out state, on the contrary, the system controller 30 sets the state of being likely to go out as the result of checking the combustion state (step 114) and stops the operation of the fuel cell system (step 116). In addition to this, the system controller 30 sets the rotational speed of the combustion air pump 65 to the rotational speed which was set before the last change (step 210), for the operation at the next time and then, terminates the present program (step 220).

For example, let it be now assumed that the output electric power quantity of the fuel cell 10 is 300 watts. If the air ratio is higher than 1.15 right before changing the supply quantity of combustion air is initiated at step 102, the combustion state of the combustion section 25 at that time is the state that much air not used for combustion causes the efficiency to go down, and the combustion section 25 should turn into the gone-state in due course by repetitively reducing the rotational speed of the combustion air pump 65 by 200 rpm (the fixed value) per change in dependence on the output electric power quantity. However, with the rotational speed right before the gone-out state arises, the air ratio is necessarily in a range of 0.98 to 1.05, and the combustion state is necessarily in the zone that the likelihood of the incomplete combustion is high. Since the state that the combustion section 25 is likely to go out is detected from the result of checking the combustion state of the combustion section 25 in this way, it can be realized to stop the operation of the fuel cell system and to set the rotational speed of the combustion air pump 65 which enables the combustion state to become an optimum combustion state, for the operation at the next time.

In the foregoing embodiment, the supply quantity of combustion air supplied to the combustion section 25 is changed by controlling the combustion air pump 65 at step 102 (supply quantity changing means). Instead, the supply quantity of combustion fuel and/or reformed fuel (combustible gas) supplied to the combustion section 25 may be changed by controlling the combustion fuel pump 45 and/or the reformed fuel pump 42. In a further modified form, it is possible to change both supply quantities of combustion air and combustible gas. In either case, step 102 serves as supply quantity changing means. Also in either case, since the supply quantity changing means changes the supply quantity of combustible gas by controlling the combustible gas supply means (the combustion fuel pump 45 and/or the reformed fuel supply pump 42), it can be realized to change the combustion state of the combustion section 25 in a simple and reliable manner.

Further, the combustion state change detecting means is for detecting a change which the combustion section 25 makes in the combustion state as a result that the respective supply quantities are changed by the supply quantity changing means, based on the detection result from the combustion state detecting means or the temperature sensor 21*c* (step 106). The combustion state checking means is for checking the combustion state of the combustion section 25 which arose before the change by the supply quantity changing means, based on the detection result from the combustion state change detecting means (steps 108 and 114). The supply quantity control means is for controlling the respective supply quantities of combustible gas and combustion oxidizing gas supplied to the combustion section 25, in receipt of the checking result from the combustion state checking means (steps 110 and 118).

As is clear from the aforementioned explanation, in the present embodiment, the supply quantity changing means (step 102) changes the supply quantity of at least either one of combustible gas and combustion oxidizing gas supplied to the combustion section 25, the combustion state change detecting means (step 106) detects a change which is caused in the combustion state of the combustion section 25 as a result that the at least either supply quantity is changed by the supply quantity changing means, based on the detection result from the combustion state detecting means (i.e., the temperature sensor 21*c*), and the combustion state checking means (steps 108 and 114) checks the combustion state of the combustion section 25 which arose before the change by the supply quantity changing means, based on the detection result from the combustion state change detecting means. Thus, it becomes possible to change the supply quantity of at least either one of combustible gas and combustion oxidizing gas supplied to the combustion section 25. In addition, since the change in the combustion state of the combustion section 25 resulting from the change in the at least either supply quantity can be detected based on the detection result from the combustion state detecting means, it also becomes possible to check the combustion state of the combustion section 25 which arose before the change by the supply quantity changing means based on the detection result. In other words, even if the changing quantity in the supply quantities of combustible gas and the combustion oxidizing gas cannot be grasped accurately and even if the measured value from any sensor for measuring parameters used in judging the combustion state is not accurate, it can be realized to check the combustion state of the combustion section 25 which arose before the change by the supply quantity changing means insofar as the supply means for combustible gas and combustion oxidizing gas and the combustion state detecting means operate correctly. Accordingly, even if the measured value from the sensor for measuring the parameters used in judging the combustion state is not accurate or without using an expensive sensor, the state that the combustion section is likely to go out can be detected reliably at a low cost.

According to the present embodiment, it is possible to use a low accurate sensor as the sensor (e.g., flow meter) for measuring the parameters used in judging the combustion state or to omit such a sensor.

Further, since the supply quantity changing means (step 102) changes the supply quantity of combustion oxidizing gas (combustion air) by controlling the combustion oxidizing gas supply means (combustion air pump 65), it is possible to change the combustion state of the combustion section 25 in a simple and reliable manner.

Figure 3:
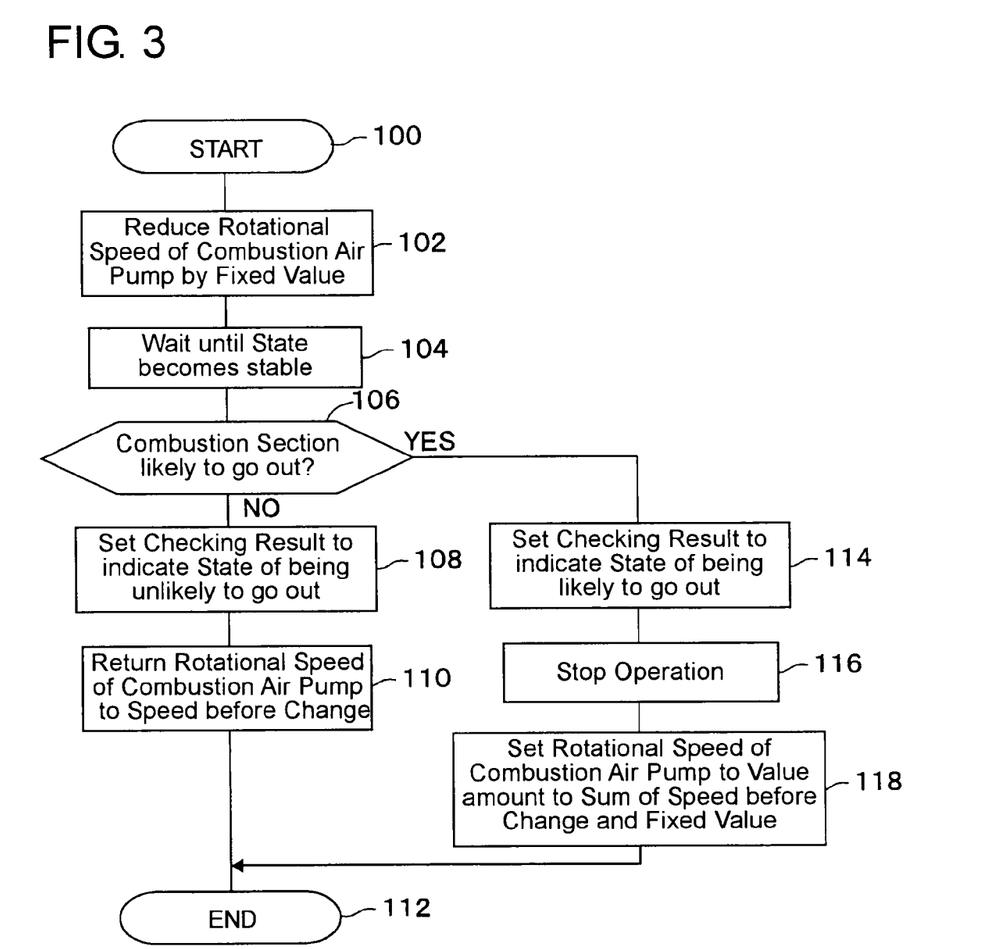
FIG. 3 is a flow chart showing a control program executed by a system controller shown in FIG. 2.

Further, as shown in FIG. 3, the supply quantity control means (step 110) is further provided for controlling respective supply quantities of combustible gas and combustion oxidizing gas supplied to the combustion section 25, in receipt of the checking result from the combustion state checking means (step 108), and if the checking result from the combustion state checking means indicates that the combustion state is unlikely to go out (step 108), the supply quantity control means returns the supply quantity of combustion oxidizing gas to the quantity which was set before the change by the supply quantity changing means (step 110). Therefore, it can be realized to reliably return the combustion state to a stable combustion state after checking the combustion state.

Further, as shown in FIG. 3, the supply quantity control means (steps 116, 118) is further provided for controlling respective supply quantities of combustible gas and combustion oxidizing gas supplied to the combustion section 25, in receipt of the checking result from the combustion state checking means (step 114). If the checking result from the combustion state checking means indicates that the combustion state is likely to go out, the supply quantity control means stops the operation of the reformer 20 by discontinuing supplying combustible gas and combustion oxidizing gas (step 116). Further, with the resumption of operation at the next time, the supply quantity control means sets the supply quantity of combustion oxidizing gas to a supply quantity which is determined by adding the predetermined quantity to the supply quantity which was set before the change by the supply quantity changing means (step 118). Therefore, it can be realized to reliably prevent the incomplete combustion and to make an optimum combustion state in the operation at the next time.

Figure 4:
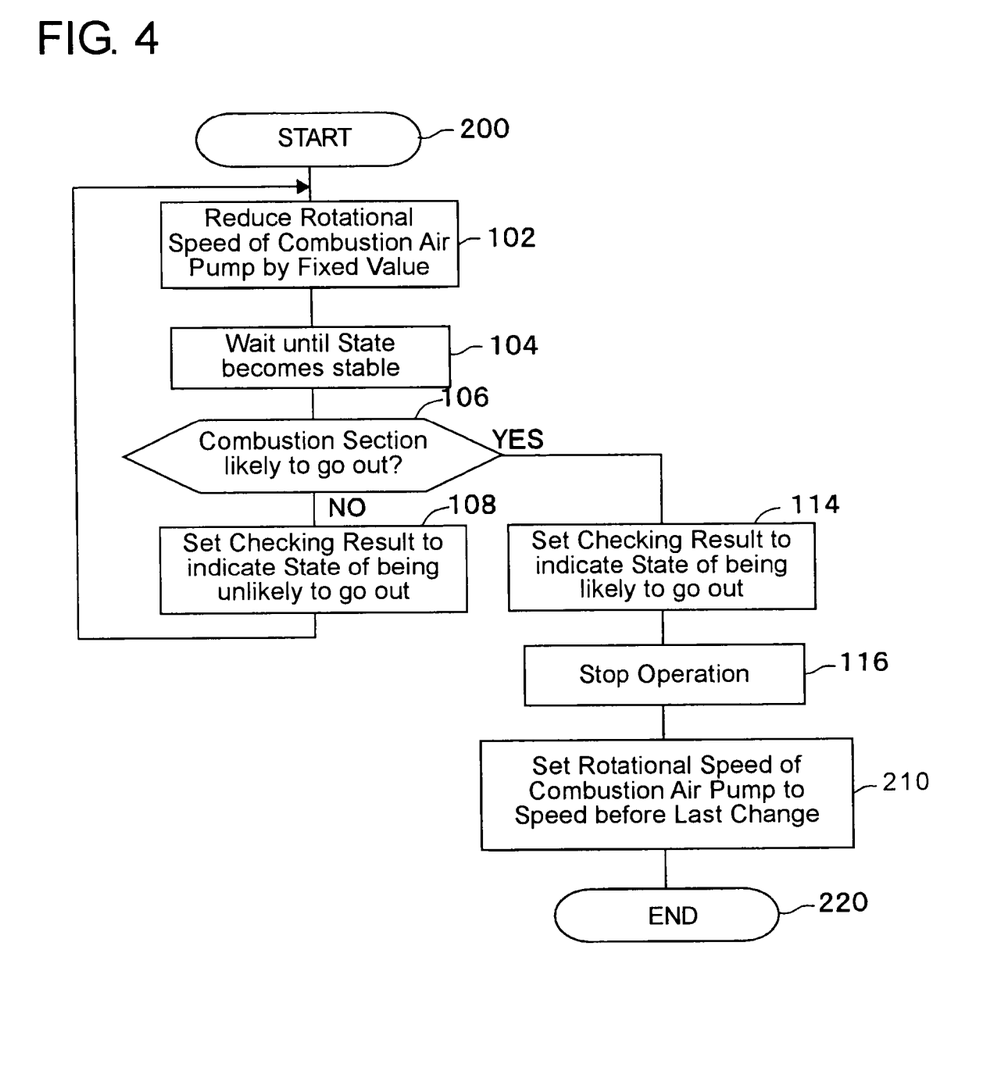
FIG. 4 is a flow chart showing another control program executed by the system controller.

Further, as shown in FIG. 4, the supply quantity control means (step 210) is further provided for controlling respective supply quantities of combustible gas and combustion oxidizing gas supplied to the combustion section 25, in receipt of the checking result from the combustion state checking means (step 114). The supply quantity changing means repetitively changes the supply quantity of the combustion oxidizing gas by the predetermined quantity per change (step 102). If the checking result from the combustion state checking means (step 114) indicates that the combustion state is likely to go out, the supply quantity control means returns the supply quantity of the combustion oxidizing gas to the supply quantity which was set before such combustion state takes place, that is, before the last change (step 210). Therefore, if the combustion state deviates from the ideal state, the supply of excess combustion oxidizing gas which does not contribute to combustion can be suppressed, so that it can be realized to suppress the heat loss and to suppress the decline in efficiency.

Further, since the predetermined quantity (the aforementioned fixed value) for the supply quantity changing means is set in dependence on the output electric power quantity of the fuel cell 10, it is possible to appropriately change the supply quantity in dependence on the output electric power quantity of the fuel cell 10.

Since the fuel cell system as constructed above according to the present invention is provided with the reformer 20 which is capable of reliably detecting the state of the combustion section 25 being likely to go out, at a low cost without using expensive sensors, it is possible to make the entire system low in cost and nevertheless, to reliably detect the state of the combustion section 25 being likely to go out.

Since in the fuel cell system as constructed above according to the present invention, the predetermined quantity (i.e., the fixed value) for the supply quantity changing means is set in dependence on the output electric power quantity of the fuel cell 10, it is possible to appropriately change the supply quantity in dependence on the output electric power quantity of the fuel cell 10.

Further, in the aforementioned embodiment, during the operation (in either of the operation starting mode and the power generation mode) of the fuel cell system, basically, reformed gas from the reforming section 21 or anode offgas from the fuel cell 10 is supplied as combustible gas to the combustion section 25 and is burned to supply the heat quantity which the reforming section 21 requires for reforming operation. However, when the heat quantity required by the reformer 21 for the reforming operation runs short, combustion fuel is additionally supplied to the combustion section 25 to replenish the deficiency of heat quantity. That is, the present invention is applied to the system of a reheating type. However, the present invention is not limited to the reheating type system and rather, may also be applicable to a non-reheating type system.

In such a non-reheating type system, for example, the system construction shown in FIG. 1 is modified to make the combustion fuel supply pipe 44 branch from the reformed fuel supply pipe 41, to decrease the two of the combustion fuel pump 45 and the reformed fuel pump 42 to either one pump (e.g., the reformed fuel pump 42 only), and to arrange the one pump on the upstream side of a branch point where the combustion fuel supply pipe 44 branches from the reformed fuel supply pipe 41. In this modified form, reformed gas from the reforming section 21 or anode offgas from the fuel cell 10 is supplied as combustible gas to the combustion section 25 to be burned, and the supply of reformed fuel to the reforming section 21 is controlled (i.e., the supply quantity from the reformed fuel pump 42 is controlled) so that the reforming operation at the reforming section 21 can be performed with the burning heat generated to the extent of being necessary and sufficient.

Obviously, numerous further modifications and variations of the present invention are possible in light of the above teachings. It is therefore to be understood that within the scope of the appended claims, the present invention may be practiced otherwise than as specifically described herein.

What is claimed is:

1. A reformer comprising:
a reforming section for generating reformed gas by reforming fuel;
a combustion section for burning combustible gas with combustion oxidizing gas to heat the reforming section with resultant combustion gas;
combustible gas supply means for supplying the combustible gas to the combustion section;
combustion oxidizing gas supply means for supplying the combustion oxidizing gas to the combustion section;
combustion state detecting means for detecting a combustion state of the combustion section; and
a controller programmed to change a supply quantity of at least one of the combustible gas supplied by the combustible gas supply means to the combustion section and the combustion oxidizing gas supplied by the combustion oxidizing gas supply means to the combustion section so as to judge whether or not the combustion section is likely to go out by making reference to a detection result from the combustion state detecting means, the detection result being a temperature of the combustion section, and further programmed to check the combustion state which existed at the combustion section before making the change in the supply quantity of the at least one of the combustible gas and the combustion oxidizing gas, based on a result of the judgment whether or not the combustion section is likely to go out.

2. The reformer as set forth in claim 1, wherein for the purpose of checking the combustion state of the combustion section, the controller changes the supply quantity of the combustion oxidizing gas by a predetermined quantity by controlling the combustion oxidizing gas supply means.

3. The reformer as set forth in claim 2,
wherein if the checking result from the controller indicates that the combustion section is unlikely to go out, the controller returns the supply quantity of the combustion oxidizing gas to a supply quantity which was set before the change in the supply quantity of the combustion oxidizing gas.

4. A fuel cell system comprising:
the former as set forth in claim 3; and
a fuel cell having a fuel electrode to which the reformed gas generated in the reformer is supplied as fuel gas;
wherein at least one of combustion fuel supplied from the outside of the system, the reformed gas generated in the reformer and fuel gas offgas discharged from the fuel electrode of the fuel cell is supplied as combustible gas to the combustion section of the reformer.

5. The reformer as set forth in claim 2,
wherein if the checking result from the controller indicates that the combustion section is likely to go out, the controller discontinues supplying the combustible gas and the combustion oxidizing gas to stop the operation of the reformer and with the resumption of operation at the next time, sets the supply quantity of the combustion oxidizing gas to a supply quantity which is determined by adding a predetermined quantity to the supply quantity which was set before the change in the supply quantity of the combustion oxidizing gas.

6. A fuel cell system comprising:
the former as set forth in claim 5; and
a fuel cell having a fuel electrode to which the reformed gas generated in the reformer is supplied as fuel gas;
wherein at least one of combustion fuel supplied from the outside of the system, the reformed gas generated in the reformer and fuel gas offgas discharged from the fuel electrode of the fuel cell is supplied as combustible gas to the combustion section of the reformer.

7. The reformer as set forth in claim 2,
wherein
the controller repetitively changes the supply quantity of the combustion oxidizing gas by the predetermined quantity per change; and
if the checking result from the controller indicates that the combustion section is likely to go out, the controller returns the supply quantity of the combustion oxidizing gas to a supply quantity which was set before the combustion section went into the state of being likely to go out.

8. A fuel cell system comprising:
the former as set forth in claim 7; and
a fuel cell having a fuel electrode to which the reformed gas generated in the reformer is supplied as fuel gas;
wherein at least one of combustion fuel supplied from the outside of the system, the reformed gas generated in the reformer and fuel gas offgas discharged from the fuel electrode of the fuel cell is supplied as combustible gas to the combustion section of the reformer.

9. A fuel cell system comprising:
the former as set forth in claim 7; and
a fuel cell having a fuel electrode to which the reformed gas generated in the reformer is supplied as fuel gas;
wherein the controller of the reformer sets the predetermined quantity in dependence on the output electric power quantity of the fuel cell.

10. The reformer as set forth in claim 1, wherein for the purpose of checking the combustion state of the combustion section, the controller changes the supply quantity of the combustible gas by a predetermined quantity by controlling the combustible gas supply means.

11. A fuel cell system comprising:
the reformer as set forth in claim 1; and
a fuel cell having a fuel electrode to which the reformed gas generated in the reformer is supplied as fuel gas;
wherein at least one of combustion fuel supplied from the outside of the system, the reformed gas generated in the reformer and fuel gas offgas discharged from the fuel electrode of the fuel cell is supplied as combustible gas to the combustion section of the reformer.

12. The reformer as set forth in claim 1, wherein the controller checks the combustion state which existed at the combustion section before making the change in the supply quantity by comparing a temperature of the combustion section before the change made by the controller to a temperature of the combustion section after the change made by the controller.

* * * * *